(12) United States Patent
Bevilacqua

(10) Patent No.: US 11,547,040 B2
(45) Date of Patent: Jan. 10, 2023

(54) EARTH LIFTER TOOL

(71) Applicant: Neil Joseph Bevilacqua, Bovina Center, NY (US)

(72) Inventor: Neil Joseph Bevilacqua, Bovina Center, NY (US)

(73) Assignee: Neil Joseph Bevilacqua, Bovina Center, NY (US)

( * ) Notice: Subject to any disclaimer, the term of this patent is extended or adjusted under 35 U.S.C. 154(b) by 0 days.

(21) Appl. No.: 17/200,040

(22) Filed: Mar. 12, 2021

(65) Prior Publication Data

US 2021/0282316 A1    Sep. 16, 2021

Related U.S. Application Data

(60) Provisional application No. 62/988,533, filed on Mar. 12, 2020.

(51) Int. Cl.
*A01D 9/02* (2006.01)
*A01B 1/02* (2006.01)
*A01B 1/04* (2006.01)

(52) U.S. Cl.
CPC ............... *A01D 9/02* (2013.01); *A01B 1/028* (2013.01); *A01B 1/04* (2013.01)

(58) Field of Classification Search
CPC .......... A01B 1/024; A01B 1/028; A01B 1/04; A01B 1/16; A01D 9/00; A01D 9/02
USPC ..................................... 294/55.5; 254/131.5
See application file for complete search history.

(56) References Cited

U.S. PATENT DOCUMENTS

| | | | |
|---|---|---|---|
| 128,150 A | | 6/1872 | Johonnott |
| 227,720 A | | 5/1880 | Baxter |
| 363,098 A | | 5/1887 | Traxler |
| 445,621 A | | 2/1891 | Kretsinger |
| 545,536 A | | 9/1895 | Russell |
| 645,268 A | | 3/1900 | Michael |
| 671,393 A | | 4/1901 | Colburn |
| 1,142,783 A | * | 6/1915 | Eagan ................. A01B 1/028 254/131.5 |
| 1,353,494 A | * | 9/1920 | Risch ................. A01B 1/024 254/131.5 |
| 1,857,500 A | * | 5/1932 | Davison ................. A01B 1/16 294/55.5 |
| 2,716,538 A | * | 8/1955 | Arrowood ............. A01B 1/16 254/131.5 |
| 3,343,807 A | * | 9/1967 | Moraski ............... A01B 1/028 294/59 |
| 3,865,348 A | * | 2/1975 | Close ................. A01B 1/16 254/132 |
| 4,809,436 A | * | 3/1989 | Crookston ............. E04G 23/08 254/131.5 |
| D351,538 S | * | 10/1994 | Gatewood ...................... D8/9 |

(Continued)

FOREIGN PATENT DOCUMENTS

FR     2806250 A1 *  9/2001 ............ A01B 1/028
GB    2 352 607    *  2/2001

*Primary Examiner* — Dean J Kramer
(74) *Attorney, Agent, or Firm* — Vedder Price P.C.

(57) ABSTRACT

Disclosed embodiments provide a device having a pivot hoop affixed to the rear side of a shaft from a hand tool such as a fork, weed lifter, or shovel. The pivot hoop provides additional leverage during operation of the tool. Disclosed embodiments provide an improved hand tool that reduces fatigue and risk of injury during use.

18 Claims, 26 Drawing Sheets

(56) References Cited

U.S. PATENT DOCUMENTS

| | | | | |
|---|---|---|---|---|
| 7,104,576 B1* | 9/2006 | Dorr | ............... | A01B 1/024 294/60 |
| 7,654,018 B2* | 2/2010 | Lancaster | ............ | A01B 1/028 37/405 |
| 2005/0082516 A1* | 4/2005 | Hayes | ............... | A01B 1/16 254/132 |

* cited by examiner

EARTH LIFTER TOOL

The present patent document claims benefit of provisional U.S. patent application Ser. No. 62/988,533, filed Mar. 12, 2020, entitled "EARTH LIFTER TOOL", the disclosure of which is incorporated herein by reference.

FIELD

Embodiments relate to an improved tool that has a variety of applications in garden and landscaping environment. It also has applications as a general lever tool.

BACKGROUND

Shovels and other earthmoving tools are often used in gardening, construction, fencing, and other assorted tasks. Operating manual excavation and earthmoving tools such as shovels, forks, and the like can involve strenuous work. Even for the physically fit, shoveling can be tiring and painful. Even if done properly, can result in injury, including herniation of discs and compressing of vertebrae. It is therefore desirable to have an improved earth lifter tool.

SUMMARY

Embodiments of the device comprise a tool including a shaft and a pivot hoop extending from the shaft.

In some embodiments, the pivot hoop extends from the shaft to the tool.

In some embodiments, the tool is a fork, having a bar and a set of tines extending therefrom.

In some embodiments, the pivot hoop is has an arc disposed in between an interface point with the shaft and an interface point with the tool.

In some embodiments, the pivot hoop extends perpendicularly from the interface point with the tool.

In some embodiments, the pivot hoop is substantially flat for approximately three inches from the interface point with the tool to the arc.

In some embodiments, the pivot hoop is welded to the bar of the fork.

In some embodiments, the pivot hoop is comprised of steel.

In some embodiments, the pivot hoop is comprised of iron.

In some embodiments, the pivot hoop is comprised of a polymer.

In some embodiments, the pivot hoop is comprised of polycarbonate.

Some embodiments further comprise a handle.

In some embodiments, the tool is a shovel.

Some embodiments include a foot mount.

In some embodiments, the foot mount is disposed on the tool.

In some embodiments, the pivot hoop has a solid body.

In some embodiments, the pivot hoop is removably clamped to the shaft.

In some embodiments, the pivot hoop has an empty body.

In some embodiments, the pivot hoop is comprised of metal.

In some embodiments, the shaft is comprised of wood, metal, carbon fiber, or other polymers.

BRIEF DESCRIPTION OF THE DRAWINGS

Features of the disclosed embodiments will be more readily understood from the following detailed description of the various aspects of the invention taken in conjunction with the accompanying drawings.

Figure 1:
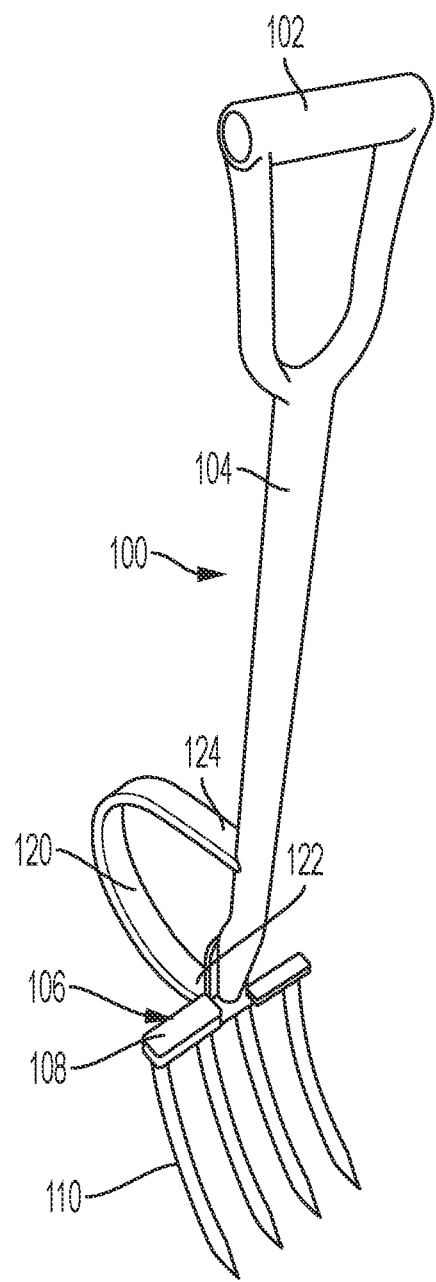
FIG. 1 shows a side front view of a device in accordance with some embodiments of the invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

There exists a need for tools that will put less strain on a user's back while manually gardening, or otherwise lifting earth, soil, or food from the ground. Disclosed embodiments provide an improved hand tool that reduces fatigue and risk of injury during use. A pivot hoop is affixed to the rear side of a shaft from a hand tool such as a fork, weed lifter, or shovel. The pivot hoop provides additional leverage during operation of the tool.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. Features, structures, and characteristics may be "mixed and matched" from one embodiment with another. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

FIG. 1 shows a side front view of a device in accordance with some embodiments of the invention. There is shown a device 100 having a handle 102, shaft 104, and a tool 106 attached to the distal end of the handle. In some embodiments, the handle and shaft may be one and the same. In some embodiments, the handle and the shaft may be made from a single contiguous material, made in any suitable manner such as injection molding, 3D printing or other process. In some embodiments, the handle, shaft, and tool may be made from a single continuous material, made in any suitable manner such as injection molding, 3D printing or other process. In some embodiments, the handle, tool, and shaft are separate pieces connected together such as through welding or other process.

As shown in the example of FIG. 1, the tool 106 is a fork, and is also referred to herein as fork 106. The fork 106 includes a bar 108 and a set of tines 110 extending therefrom. Pivot hoop 120 extends from an interface point 124 at the shaft to an interface point 122 at the bar (or component of other tool in alternative embodiments). During use of the device 100, the pivot hoop 120 can serve as a fulcrum to assist in operating the device 100 to lift/move a payload, creating a force multiplier effect. In some use cases, the payload may be dirt, snow, rocks, root crops, weed roots, tubers for bulb division, turf and bush balls, and/or other loose material. In the embodiment shown here, the pivot hoop has an empty body, as there is empty space between the hoop and the shaft.

"Interface point" herein means a location where the pivot hoop meets the shaft or tool. In some embodiments, the interface point is where the pivot hoop is mechanically attached to the shaft or tool, for example without limitation, welding, mechanical bonding, clamps or other technique or attachment device. In some embodiments, the interface point is where the pivot hoop meets the shaft or tool. In such the pivot hoop is integral with the shaft or tool, where they are one monolithic piece, made for example without limitation, by 3-dimensional printing or injection molding. The interface points of FIGS. 1-7 can represent either mechanical attachment or of an integral nature. Note that in some embodiments, the hoop can interface with the shaft at two locations on the shaft, rather than the shaft at one location and the tool at the other, like shown in FIG. 18.

In some embodiments, the tool 106 may alternatively be something other than a fork. Examples of tool 106 may include, but are not limited to, a shovel, spade, weed remover, hoe, aerator, tiller, or other suitable tool.

Referring again to an embodiment of the device that is a fork (as shown in FIG. 1), there are certain use cases that are specific to forks, as compared to shovels and other tools. With shovels and other tools, the user often is not concerned about the payload. For example, when performing an excavation, the user typically is not concerned with treating the removed soil delicately. In contrast, forks are often used in gardening operations where the payload is to be treated with utmost care. Examples include flower bulbs such as dahlia, iris, daffodil, gladiola, and other varieties. The gardening operations can include lifting of delicate tubers and/or roots up and out of a hole. It is also desirable to be able to operate the fork in such a way as to hover above a hole while holding the plants, tubers, bulbs, balls, and/or roots. It is also desirable to be able to lower the plants, tubers, bulbs, balls, and/or roots, into a hole in a controlled manner to facilitate planting. Disclosed embodiments, utilizing a fork 106 along with the pivot hoop 120, provide the mechanism to allow the precise control of the payload, keeping it from being damaged, while also providing the ergonomic considerations to allow manipulation of the plants, tubers, bulbs, balls, and/or roots, without undue stress and/or risk of injury.

Figure 2:
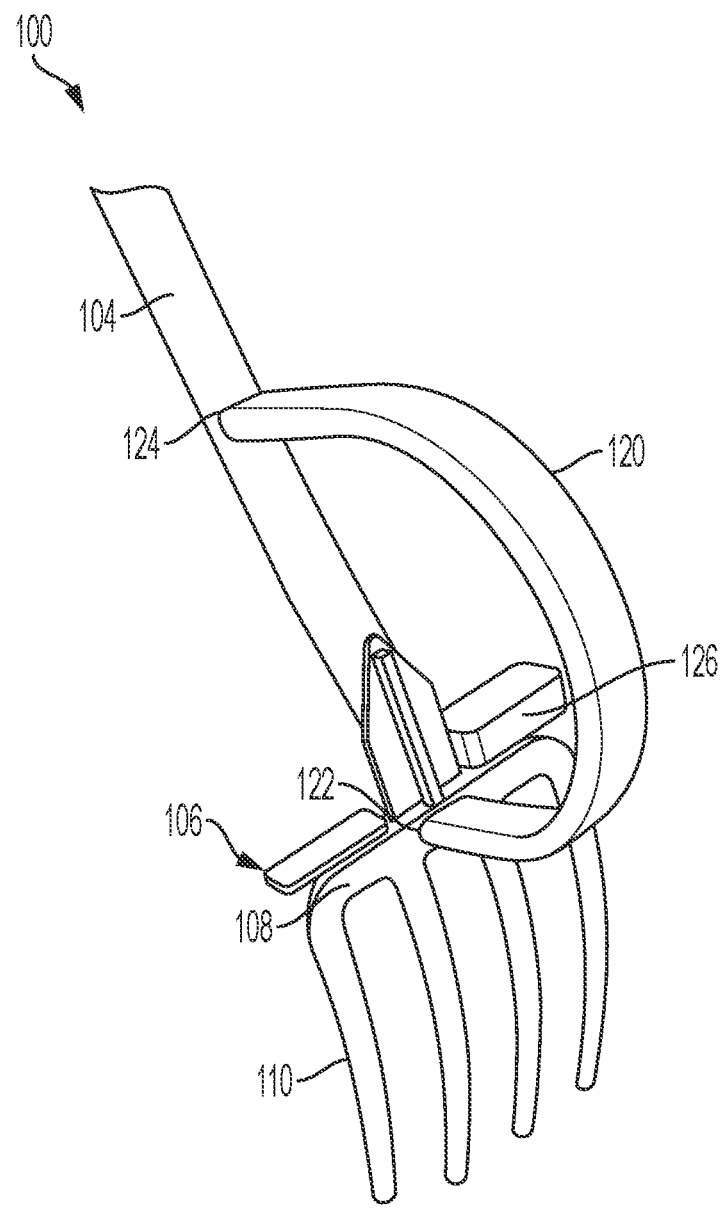
FIG. 2 is a partial side back view of the device 100

Referring now also to FIG. 2, which is a partial side back view of the device 100, the pivot hoop against the shaft 104 is referred to as "D-shaped" since it resembles a capital letter "D". In some embodiments, the pivot hoop 120 is metal, and is welded to the shaft 104 and fork 106. This addresses the moments of force in a compressive manner and not a flexural manner. Due to the geometry of the bent, welded metal, the forces throughout movement of the unitized pivot hoop distributing the forces (weight) throughout the entire pivot hoop structure. This is in order to provide maximum structural integrity. The forces are distributed and converted in a compressive manner. In some embodiments, the pivot hoop 120 may be attached to the shaft 104 at both attach points, and not directly attached to the fork 106. In some embodiments, a foot support 126 may be affixed to the fork 106 for additional force for inserting the device into the ground during use.

Figure 3:
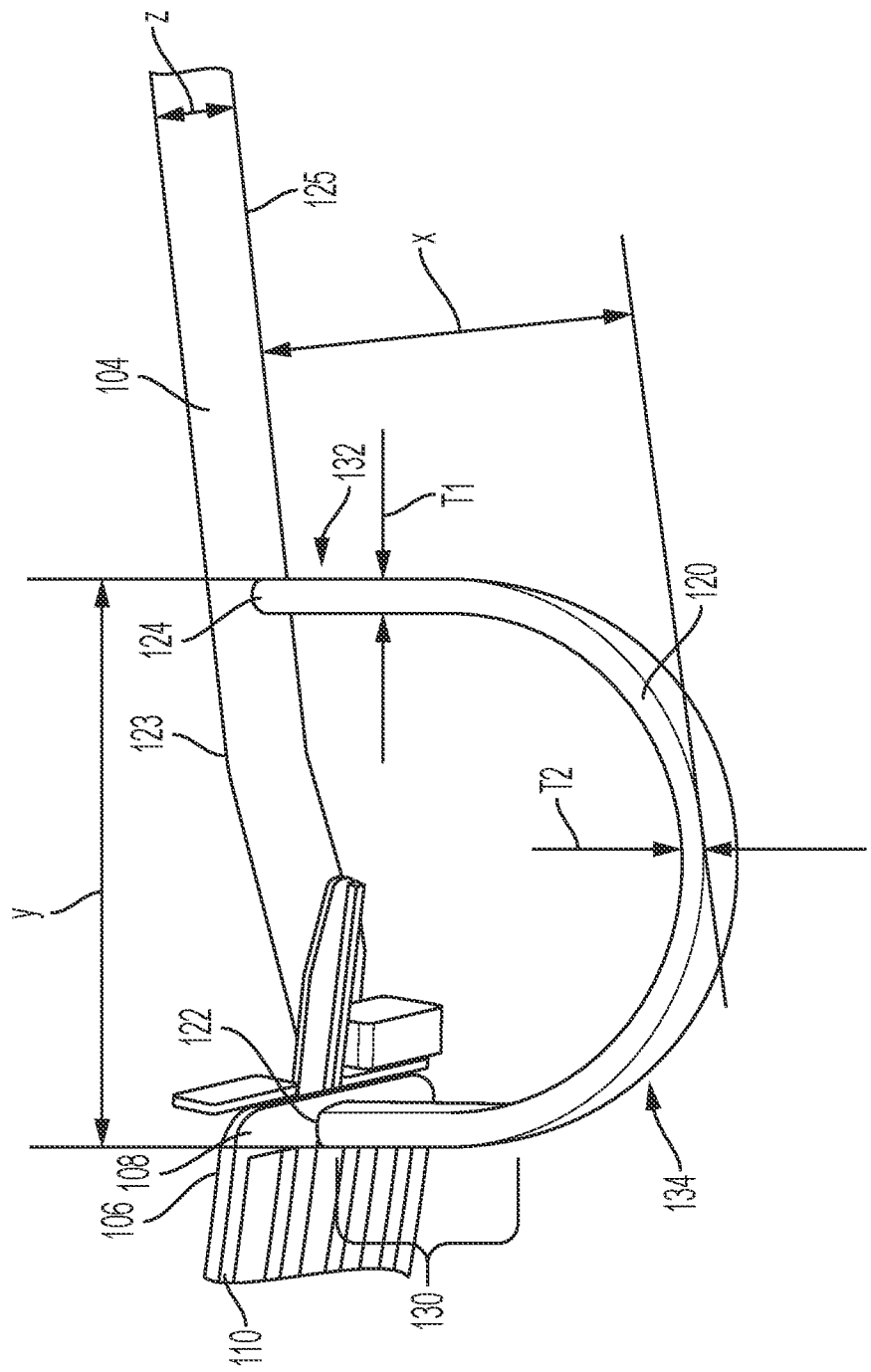
FIG. 3 shows a side view of a portion of an embodiment.

FIG. 3 shows a side view of a portion of the device. The pivot hoop 120 is attached to the shaft 104. The shaft 104 includes a front side 123, and a rear side 125. The pivot hoop 120 is attached to the shaft 104 such that it extends from the rear side 125 of the shaft. The pivot hoop 120 has a flat portion 130 (in some embodiments, extending approximately 3 inches from the interface point to the arc 134). It then transitions to an arc 134 that enables a lifting action that raises the entire lever (including tines) towards a horizontal orientation as the device is being operated. The arc 134 acts as a continuous fulcrum. Rather than a fulcrum used as a point, the continuous fulcrum utilizes the arc, and allows a "rolling" motion during use. The surface area of the pivot hoop that contacts the ground during use is wider than a point fulcrum, spreading the force load onto a segment of the arc and rolling in one direction increasing stability of the device during use. In some embodiments, on pivot hoop 120, there may be a second substantially flat portion 132 between the arc 134 and the interface point 124, which can be used by a user as a secondary foot support during operation. The arc portion 134 of the pivot hoop enables unitary weight distribution, as well as the ability to lift the entire plane of the tool towards a horizontal outcome. In embodiments, portions 130 and 132 have a thickness T1, and arc 134 has a thickness T2, where T1 is greater than T2. In some embodiments, T1 is in the range of 3 to 4 centimeters, and T2 is in the range of 1 to 2 centimeters. The pivot hoop forms a semi-circle type shape between the interface points, or a "D" shape including the shaft. The arc is substantially rounded. In some embodiments, the arc extends approximately 180 degrees between the flat portions.

The "Point of Pivot" of the geometric arc is set back by the flat portion 130 of the pivot hoop 120. While in operation the entire tool 100 rolls towards the operator. That motion elevates the plane of the lever to approach the horizontal within the square footage of the work area. The transition to the arc 134 from the flat portion 130 determines the amount of displacement of the shaft 104 required to go from a vertical to a horizontal plane for the tool 106.

By setting back the initiation of the pivoting motion and 'rolling back' (moving back towards the operator), it induces a lifting motion (rather than a 'wedging' motion).

This is much more efficacious and allows minimal root friction and preserves the integrity of soil structure and creates a very small footprint and at the same time gives a more perfect 'presentation' for a major usage. There is a huge world of nursery, landscape and garden use whereby one wants to lift an established bush or planting and lift it gently, with the least effort out of a hole and be able to slide burlap under and tie up a 'root ball' (also referred to as "Ball and Burlap", or B&B). This is a common operation in a nursery or garden center.

In use, embodiments including a fork tool need to 'bottom out' at ground contact point with the maximum penetration of the tines BUT must not (and cannot due to flat area of pivot hoop) go any deeper in order to facilitate the geometric motion of lifting. The bottom of the pivot hoop 120 has the bottoming, flat 'buoyant' aspect (130) needed to not sink further and introduce the recessed lifting arc region 134.

In another embodiment, for example, a weed puller, the lower terminal extent of the pivot hoop will also be the optimal and maximal penetration point to not interfere with but actually facilitate the rolling and lifting geometry. In some of the embodiments, both interface points of the pivot hoop may be on the shaft, rather than on the tool.

Figure 4:
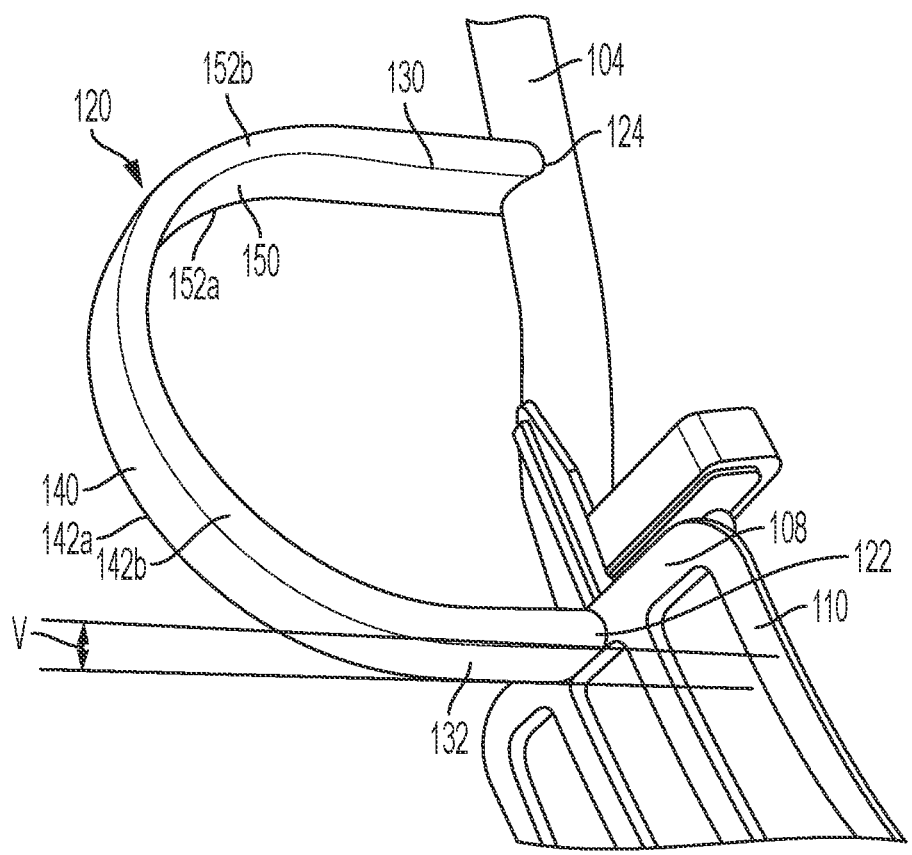
FIG. 4 shows a partial back side view of a portion of embodiments from another angle.

FIG. 4 shows a partial back side view of a portion of the device 100 from another angle. As evident from the image, in some embodiments, the center portion of the arc, on the exterior of the pivot hoop 120, may be a concave shape, forming a canal 140 with tracks 142a, 142b on each side. In some embodiments, the center portion of the arc, on the interior of the pivot hoop 120, may be a concave shape, forming a canal 150 with tracks 152a, 152b on each side. These tracks may be used to provide additional rigidity for the pivot hoop 120. In embodiments, tracks 142a and 152a may be contiguous edges of the pivot hoop. Tracks 142b and 152 be may similarly, together form a continuous rounded edge of the pivot hoop 120.

Referring again to FIGS. 3 and 4, the values for the value for V may range from one to two inches, the value for X may range from seven to nine inches, the value for Y may range from nine inches and twelve inches, and the value for Z may range from one to two inches. In some embodiments, the length of the device from the top edge of the handle to the bottom edge of the tines may range from 37 to 42 inches. These dimensions are approximate examples, and other suitable dimensions are included within the scope of the invention.

Figure 5:
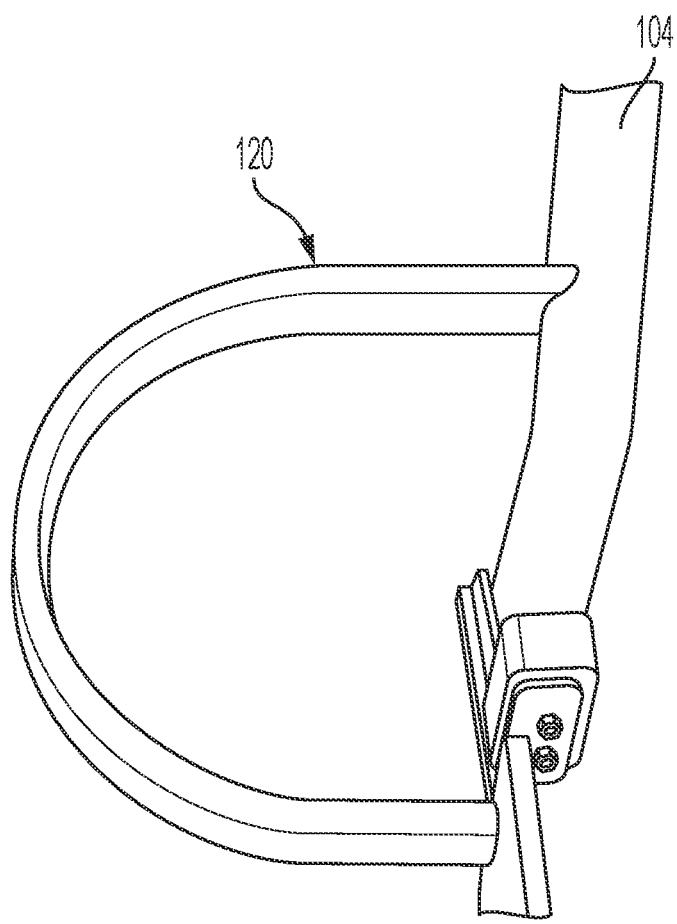
FIG. 5 shows a side view of a portion of the device showing the configuration of the pivot hoop as affixed to handle.

FIG. 5 shows a side view of a portion of the device 100 showing the configuration of the pivot hoop 120 as affixed to handle 104.

Figure 6:
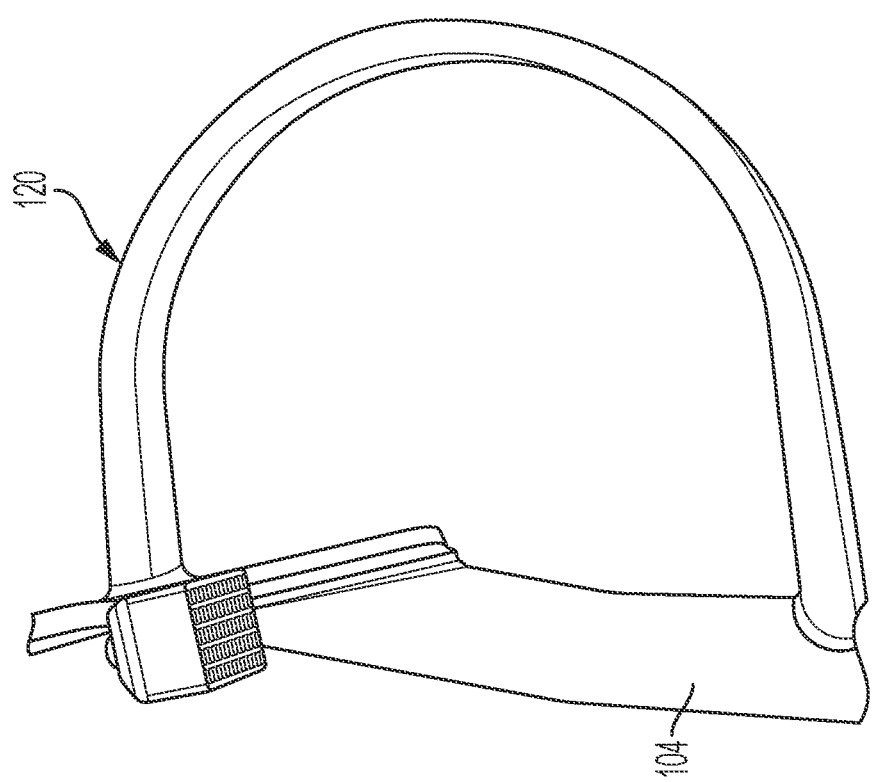
FIG. 6 shows a side view of a portion of the device showing the configuration of the pivot hoop as affixed to handle.

FIG. 6 shows a side view of a portion of the device 100 showing the configuration of the pivot hoop 120 as affixed to handle 104.

Figure 7:
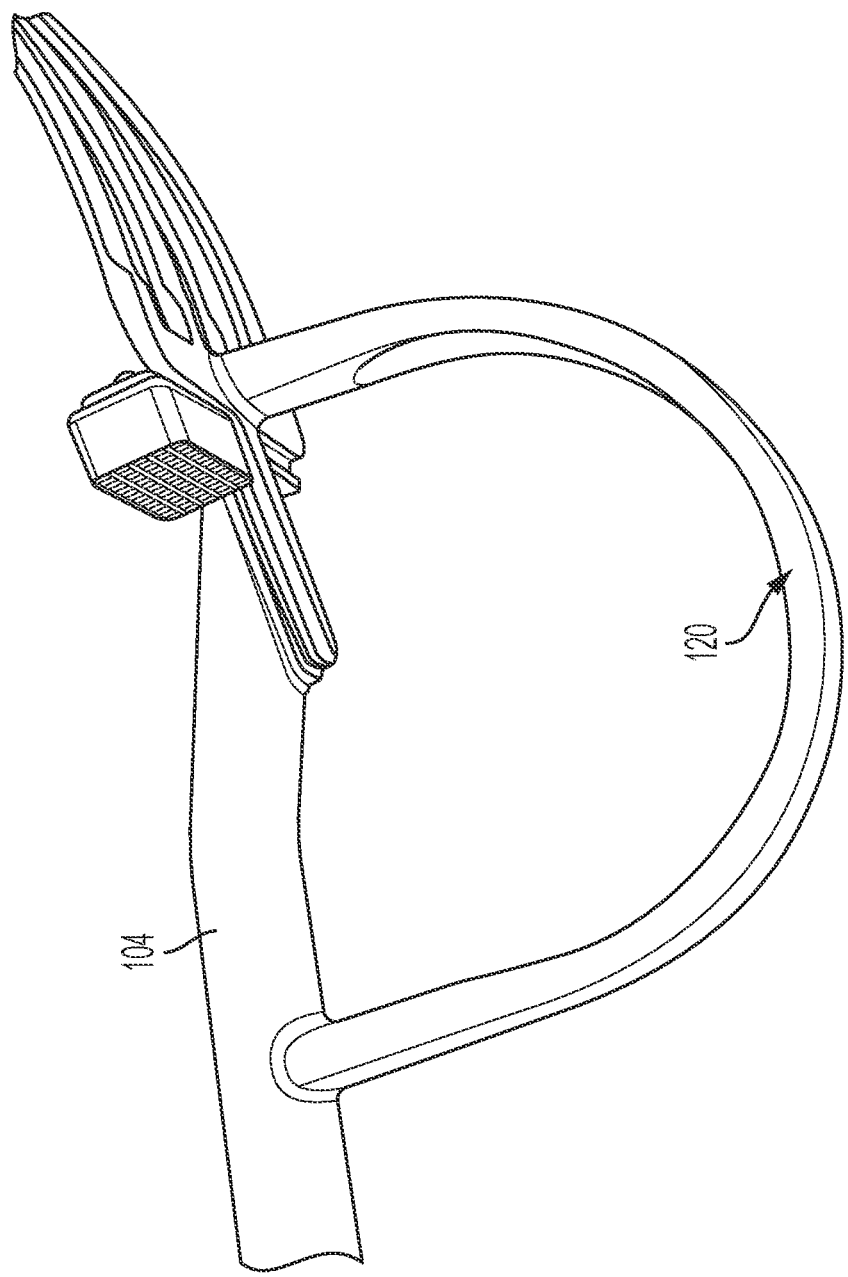
FIG. 7 shows a side view of a portion of the device showing the configuration of the pivot hoop as affixed to handle.

FIG. 7 shows a side view of a portion of the device 100 showing the configuration of the pivot hoop 120 as affixed to handle 104.

FIGS. 8-16 show an example usage of an embodiment of the invention device 200 in conjunction with a sample environment. The sample environment 250 includes a box 255 having a window 260. The interior of the box 255 is filled with loose material 262 and some items of food (not in view) buried therewith.

Figure 8:
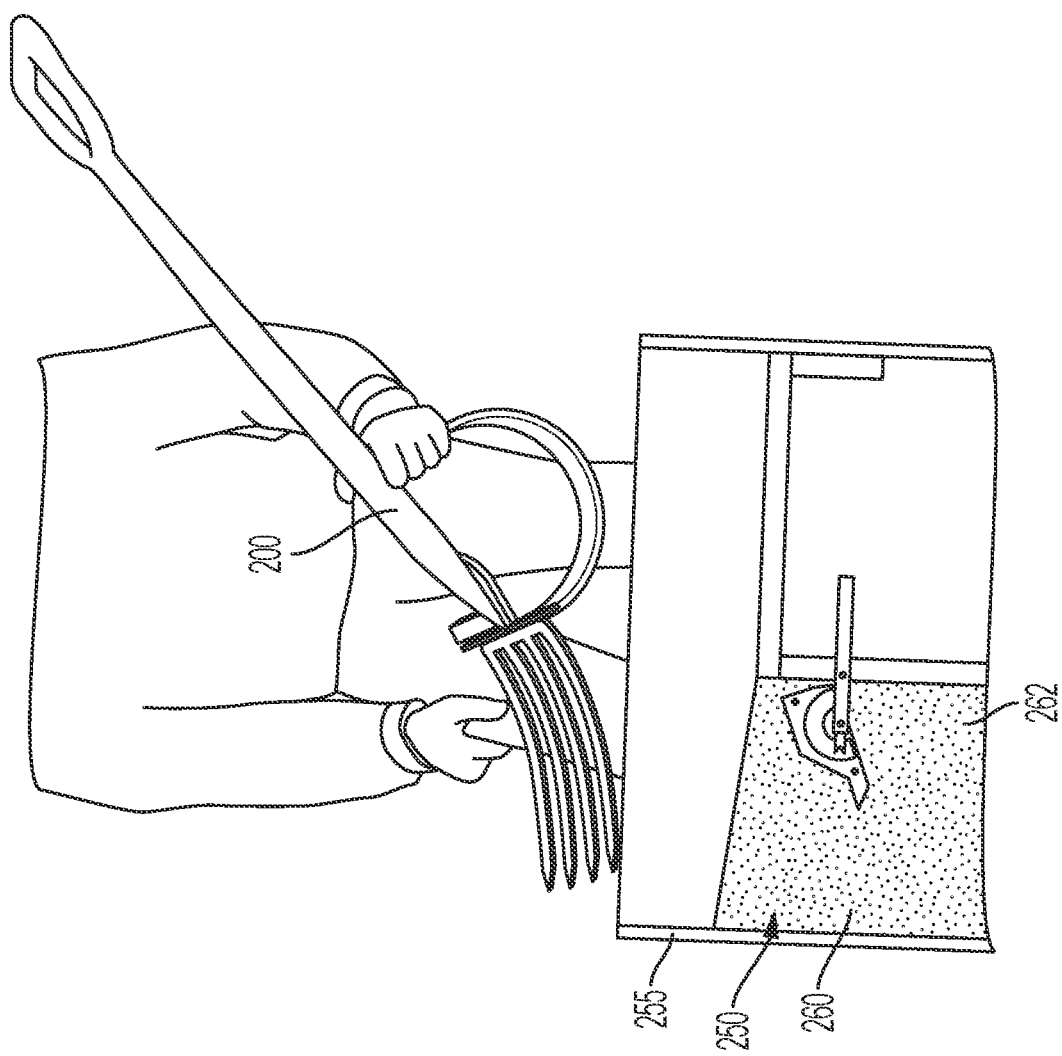
FIG. 8 shows a person holding an embodiment of the device above the sample environment.

FIG. 8 shows a person 202 holding the device 200 above the sample environment 250. The device 200 has not yet been inserted into the sample environment 250.

Figure 9:
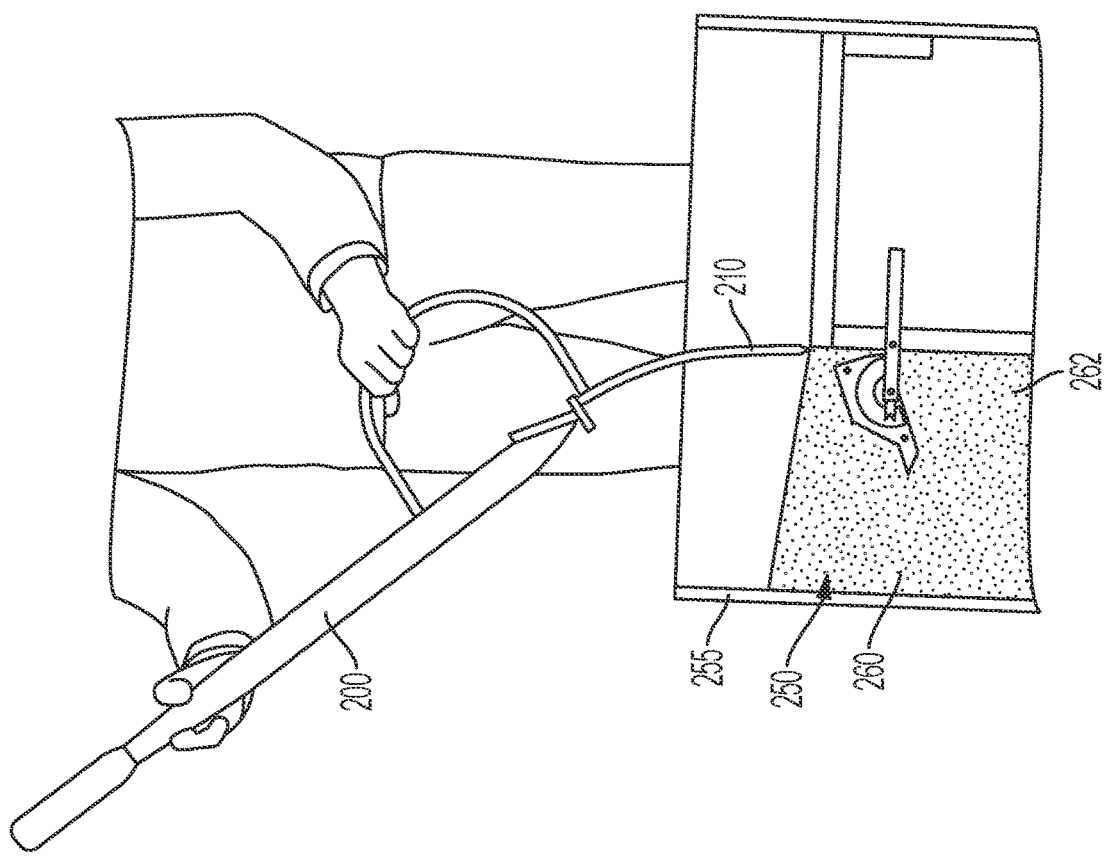
FIG. 9 shows the person positioning an embodiment of the device vertically with the tines into the loose material.

FIG. 9 shows the person 202 positioning the device 200 vertically with the tines 210 into the loose material 262.

Figure 10:
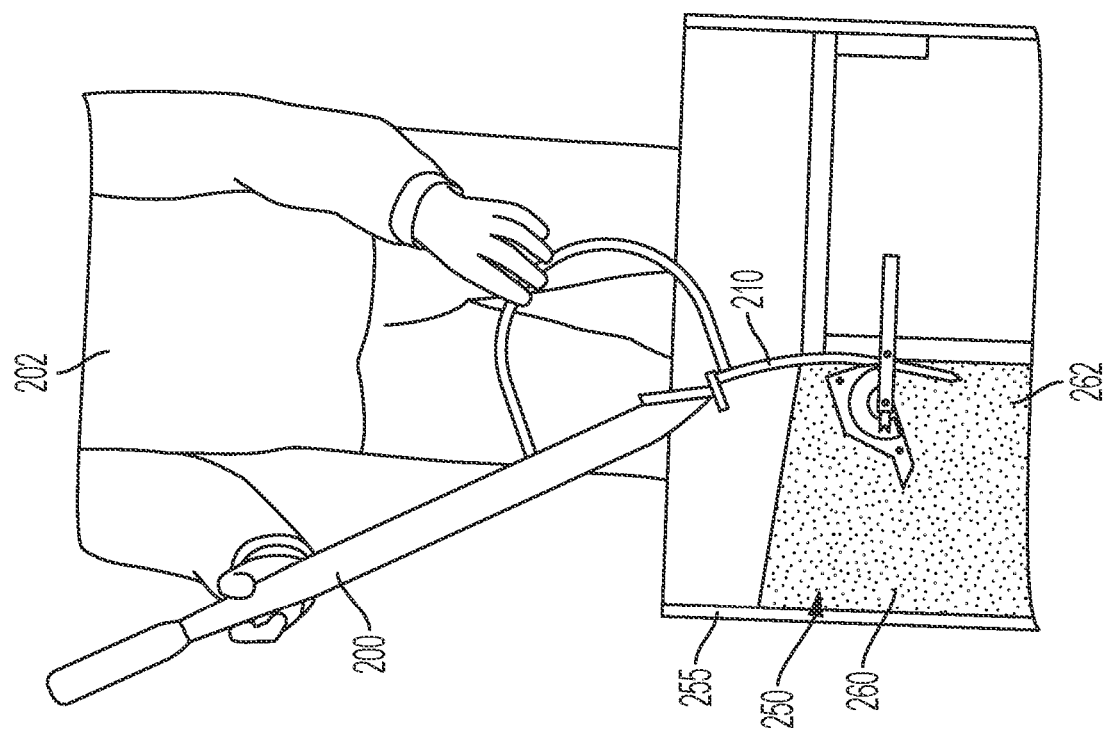
FIG. 10 shows the person pushing the device further down into the loose material 262.

FIG. 10 shows the person 202 pushing the device 200 further down into the loose material 262.

Figure 11:
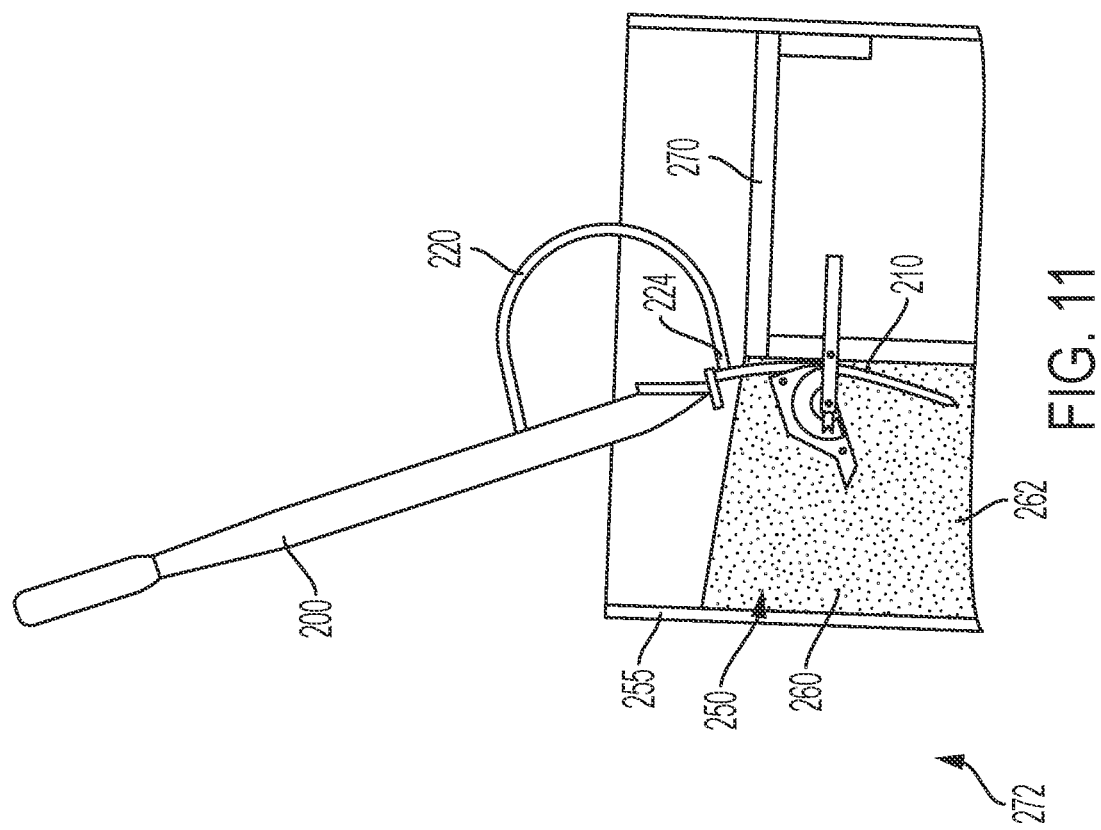
FIG. 11 shows the device with the flat portion of the pivot hoop near interface point coming into contact with the back of the environment.

FIG. 11 shows the device 200 with the flat portion of the pivot hoop 220 near interface point 224 coming into contact with the back of the environment, which is a flat board 270 perpendicular to the floor. In practice, a person would be pulling the handle toward themself.

Figure 12:
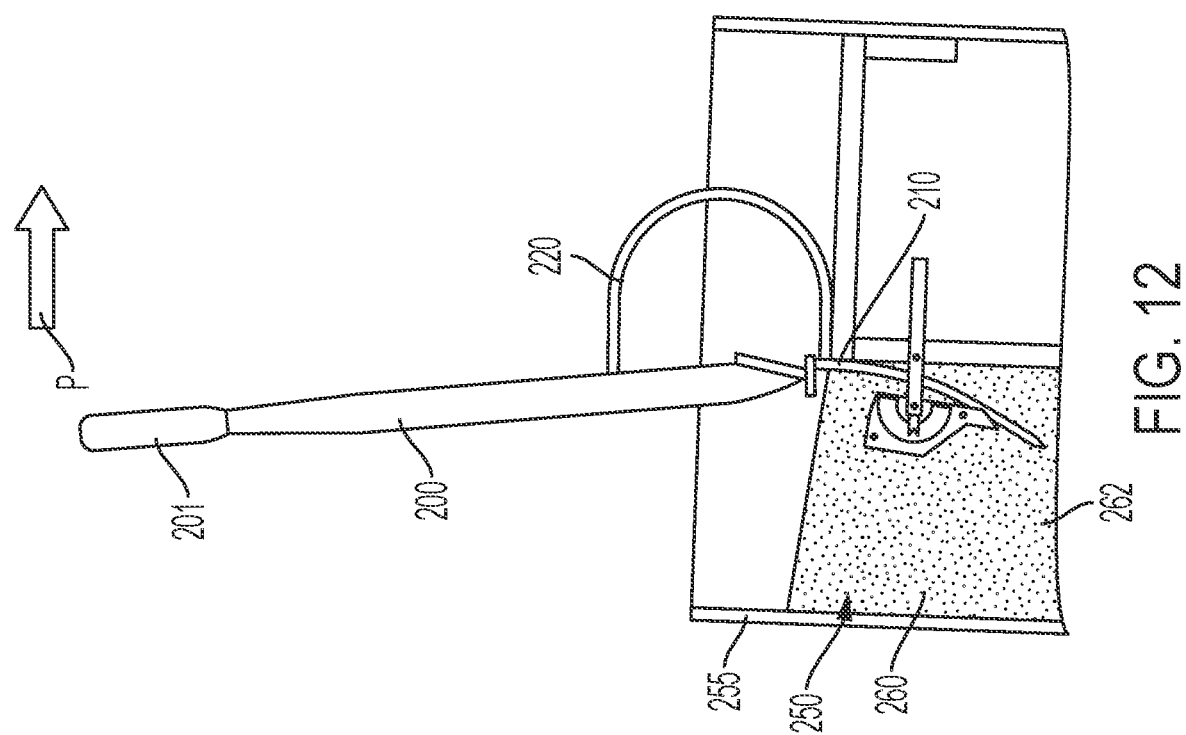
FIG. 12 shows the device pulled back such that the flat portion is in full contact with the board.

FIG. 12 shows the device 200 pulled back such that the flat portion is in full contact with the board 270. During use, the person 202 pulls the handle 201 towards the user 202 (moving the handle 201 in the direction indicated by arrow P), the device 200 begins to rotate on the pivot hoop 220 to transition from a vertical position towards a horizontal position. In practice, a person would be pulling the handle toward themself.

Figure 13:
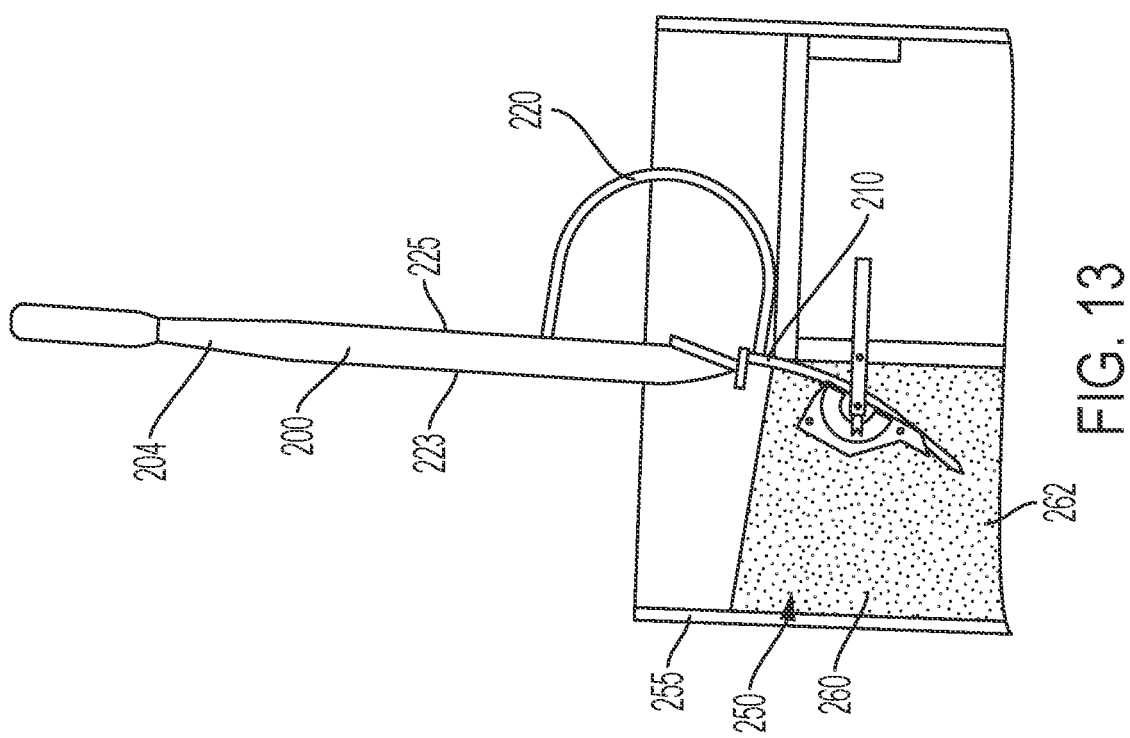
FIG. 13 shows the tines coming upward as the device is pulled back further into a horizontal position.

FIG. 13 shows the tines 210 coming upward as the device 200 is pulled back further into a horizontal position. As labeled in this figure, the shaft 204 includes a front side 223 and a rear side 225. During typical intended use, the rear side 225 is facing towards the person 202 that is operating the device 200. In practice, a person would be pulling the handle toward themselves, and starting to push downward. Device 200 is balancing on pivot hoop 220.

Figure 14:
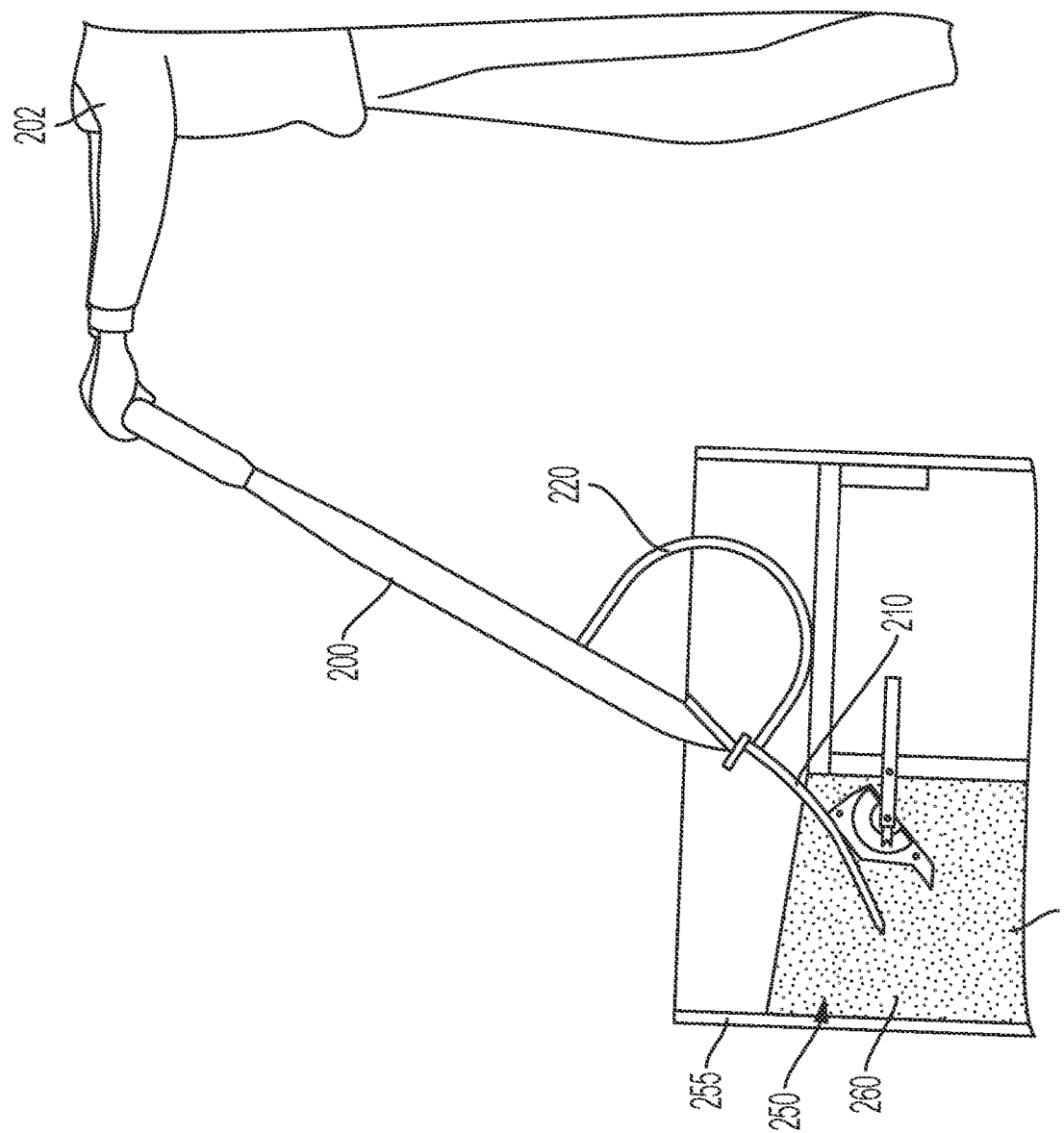
FIG. 14 shows the tines yet further upward as the device is pulled yet further towards a horizontal position.

FIG. 14 shows the tines 210 yet further upward as the device 200 is pulled yet further towards a horizontal position. In practice, a person 202 would be pushing the handle downward. Device 200 is balancing on pivot hoop 220.

Figure 15:
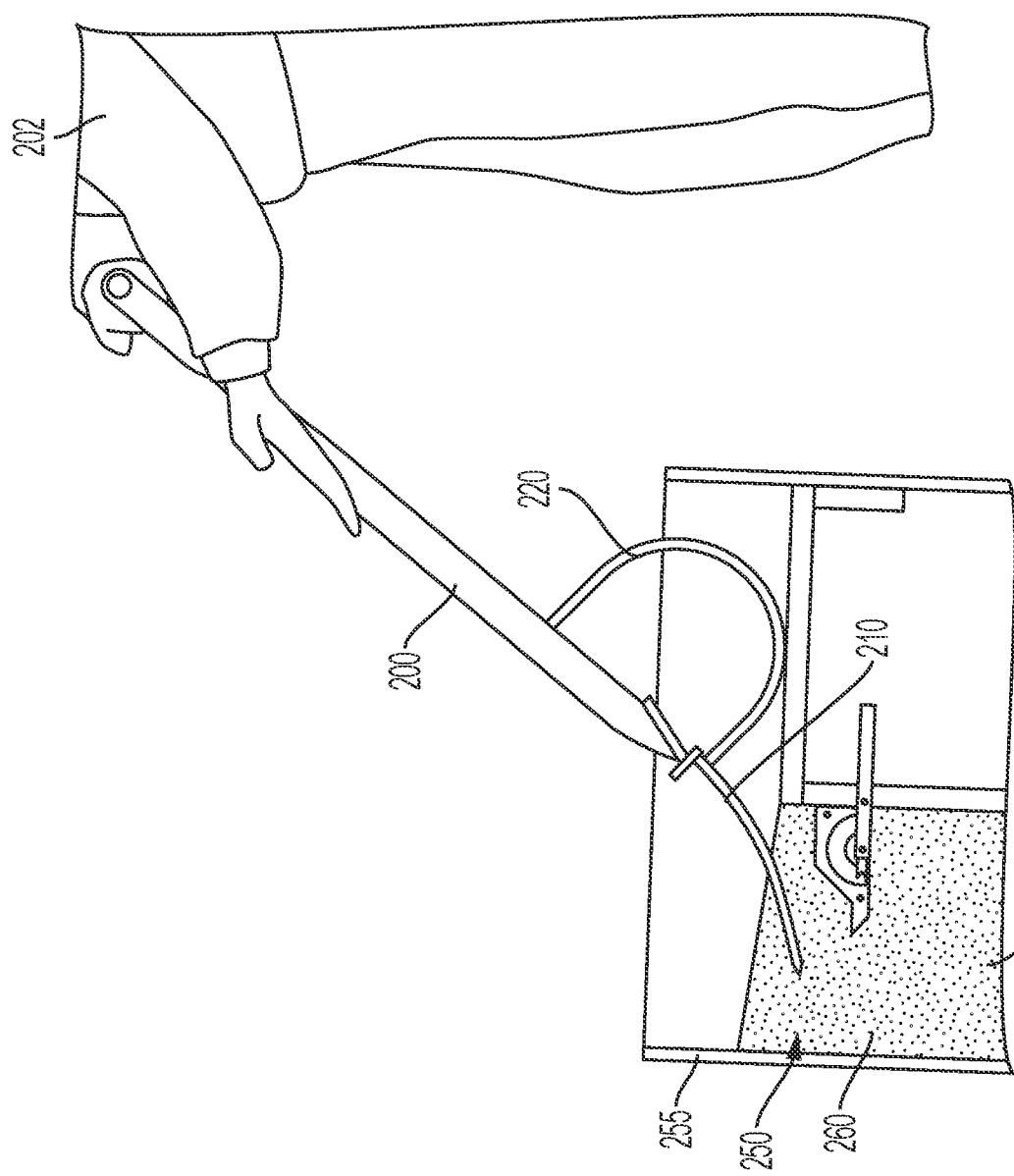
FIG. 15 shows a continuation of the process of FIG. 14.

FIG. 15 shows a continuation of the process. In practice, a person 202 would be pushing the handle downward. Device 200 is balancing on pivot hoop 220.

Figure 16:
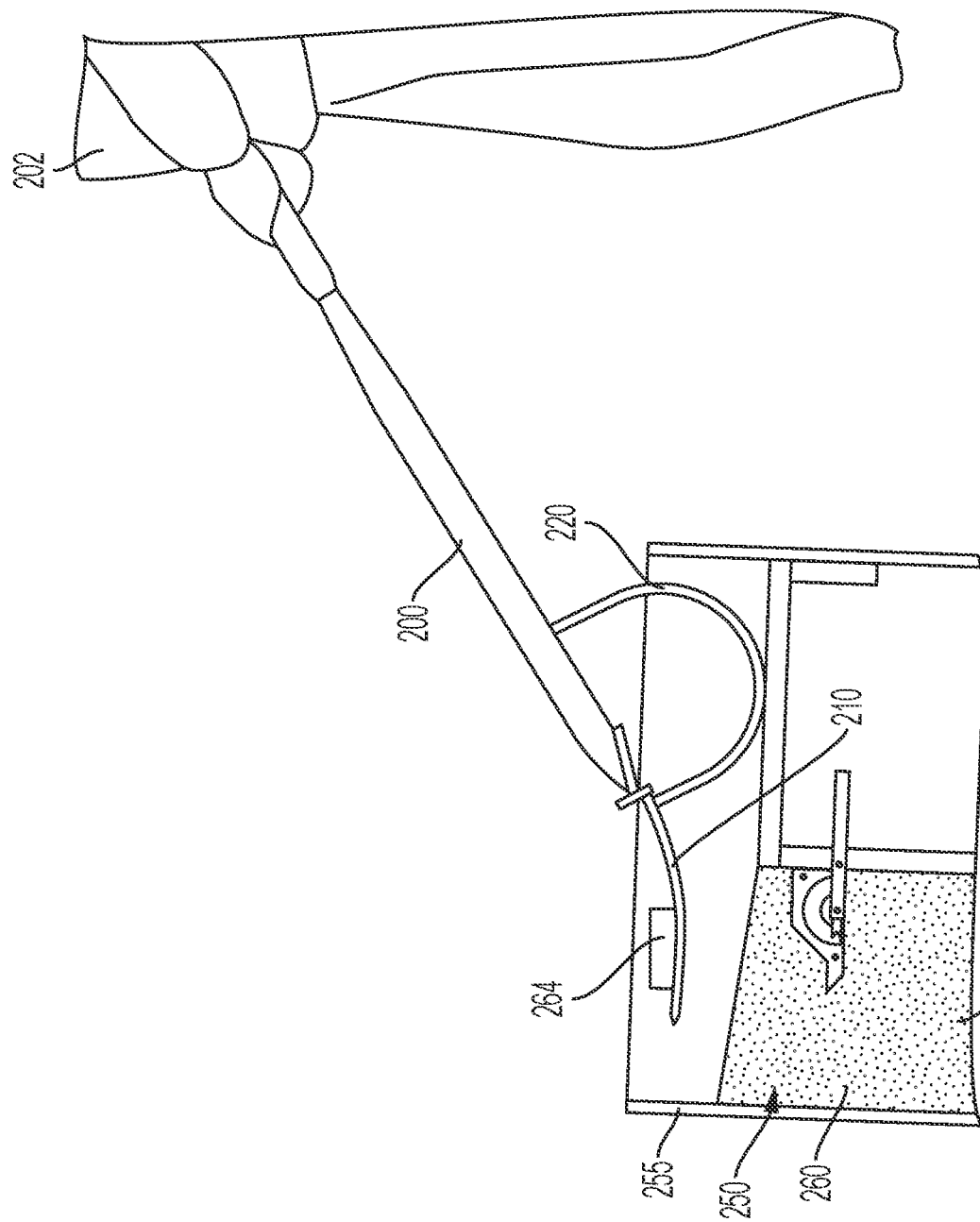
FIG. 16 shows the device balancing on the pivot hoop.

FIG. 16 shows the tines 210 almost fully horizontal, with the device 200 balancing on the pivot hoop 220. The item 264, which was buried in the loose material 262 is held in the tines 210. Here, the person 202 is holding the device as it is balanced on pivot hoop 220.

FIGS. 17-20 show an embodiment 300 being used to lift earth.

Figure 17:
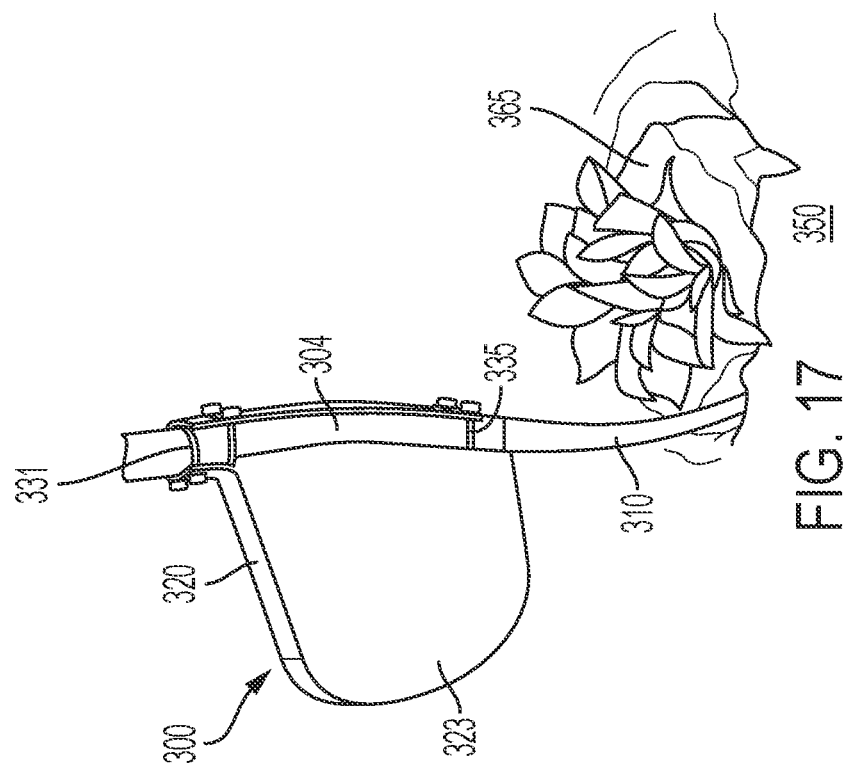
FIG. 17 shows a partial view of a user inserting the tines of the device vertically into the earth.

FIG. 17 shows a user inserting the tines 310 of the device 300 vertically into the earth 350. The pivot hoop 320 is affixed to shaft 304, and at a position above the earth. In the embodiment shown in FIG. 17, the pivot hoop 320 is affixed to the shaft 304 via clamp 331 and clamp 335. In this embodiment, the pivot hoop 320 may be removed from the shaft for storage, or for use of the device 300 without the pivot hoop 320 if so desired. In embodiments, the clamp 331 and clamp 335 may be secured via bolts, screws, and/or other suitable fastening mechanism. Note that although shown here with the clamps as a solid-body pivot hoop here, it can alternatively be an open body like FIG. 1.

Figure 18:
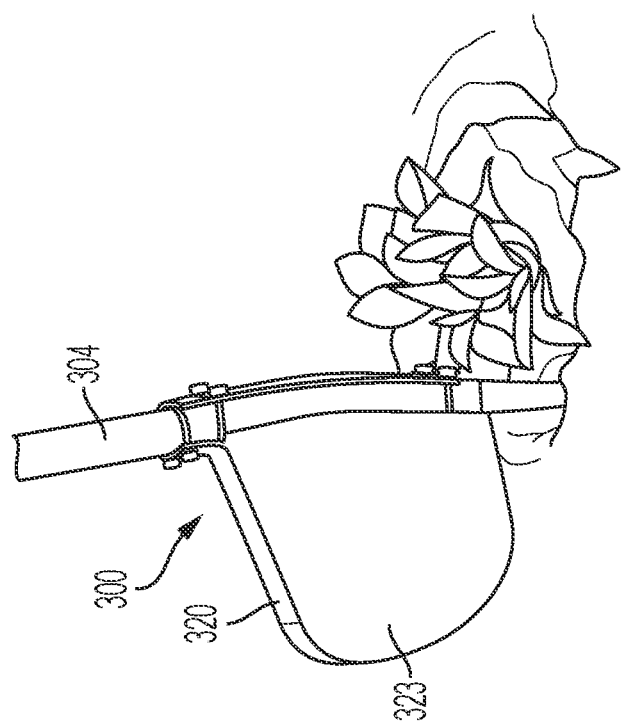
FIG. 18 shows a partial view of the user and the device of FIG. 17 with the tines fully into the earth.

FIG. 18 shows the tines fully into the earth. The user has stepped on the foot support to push the device down. The pivot hoop 320 is in contact with the earth.

Figure 19:
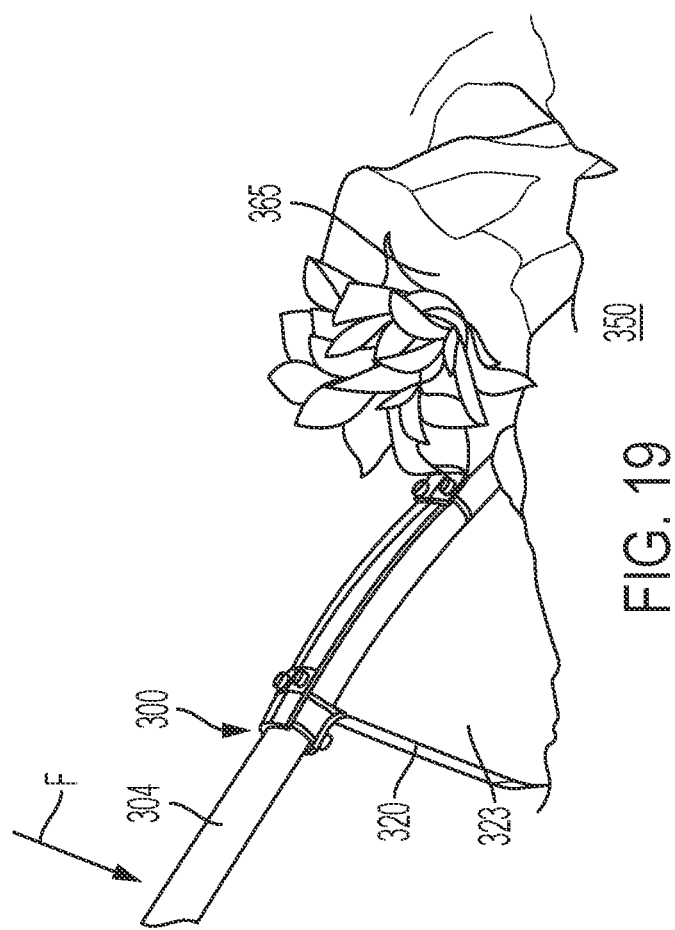
FIG. 19 shows the user pushing the device of FIG. 18 into a horizontal position, balancing the device on the pivot hoop.

FIG. 19 shows the user pushing the device into a horizontal position, balancing the device on the pivot hoop 320. The tines 310 are lifting up the earth as they raise up as downward force is applied to shaft 304 as indicated by arrow F.

Figure 20:
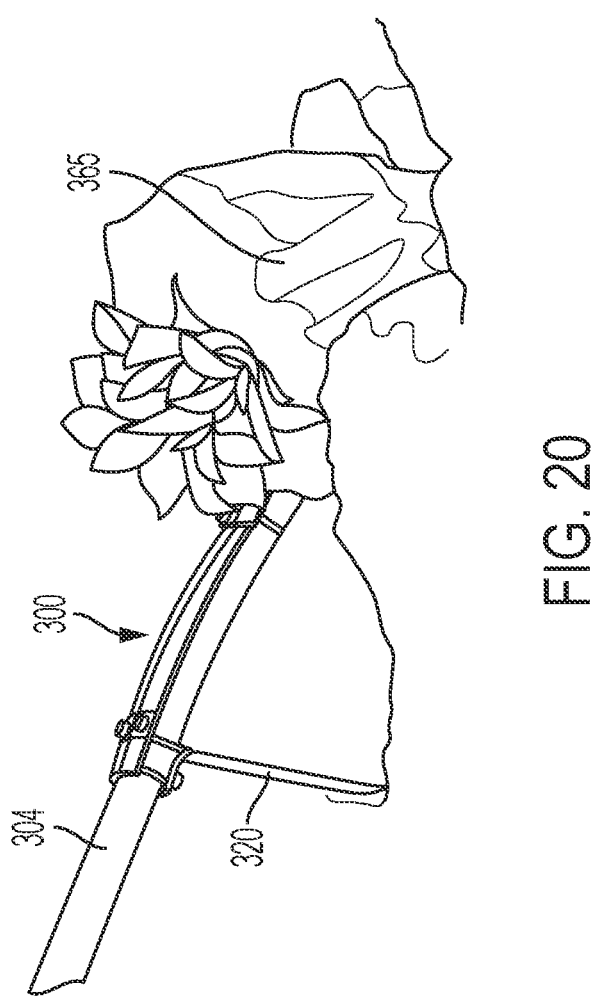
FIG. 20 shows the device of FIG. 19 with portion of earth removed from the ground, as it has been pushed to pivot on the arc of the pivot hoop.

FIG. 20 shows the device with portion 365 of earth 350 removed from the ground, as it has been pushed to pivot on the arc of the pivot hoop 320. In this embodiment, pivot hoop 320 has a solid body 323. Solid body 323 can be metal, plastic or other suitable material.

Figure 21:
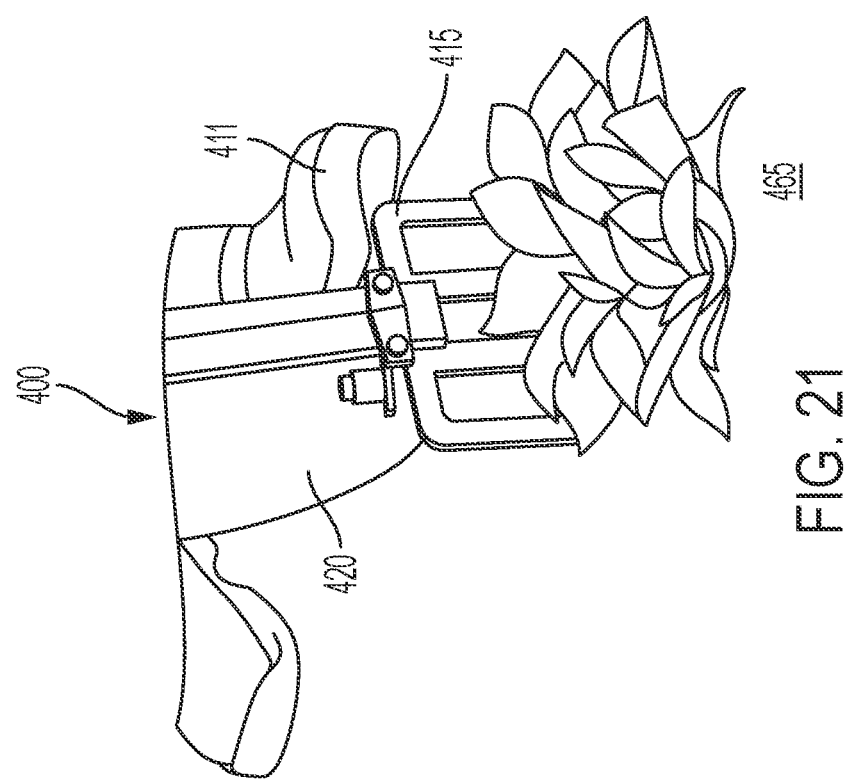
FIG. 21 is a partial view of a user positioning and pushing the device of FIG. 20 down into the earth.
Figure 22:
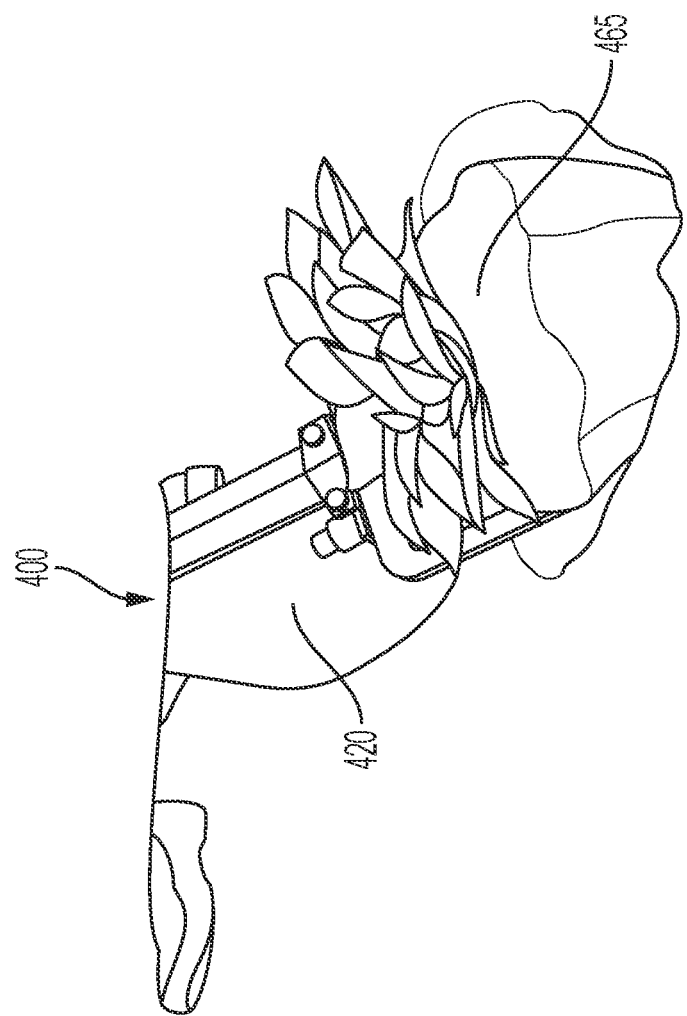
FIG. 22 is a partial view of the device of FIG. 21 holding earth after being pivoted on the arc of the pivot hoop.

FIGS. 21 and 22 show another example of usage of an embodiment of the invention. FIG. 21 shows a user positioning and pushing the device 400 down into the earth 465, using the force of a foot 411 on the fork 415. In the example here, foot supports are not included. FIG. 22 shows the device 400 holding earth 465 after being pivoted on the arc of the pivot hoop 420.

Figure 23:
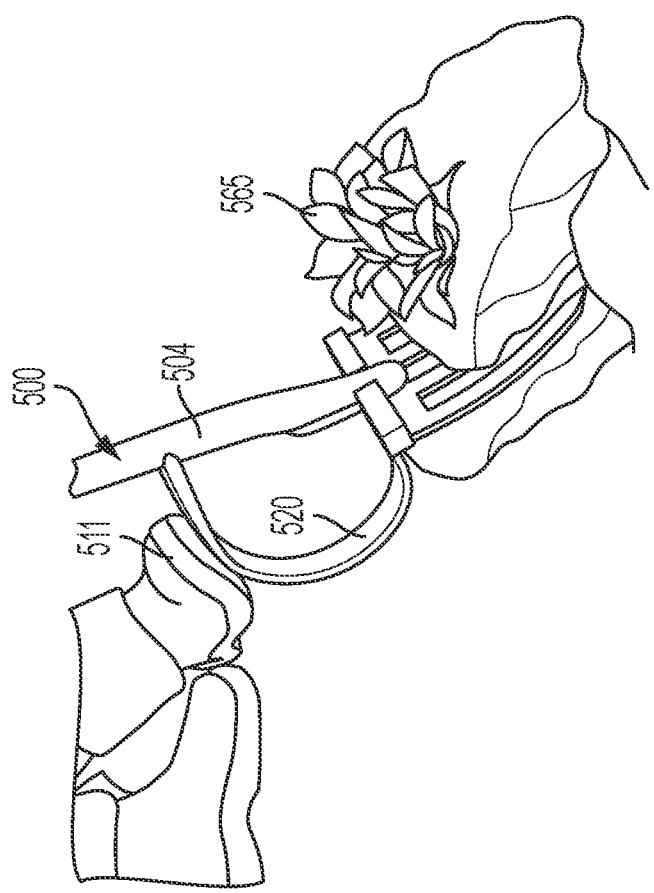
FIG. 23 shows a partial view of a person using an embodiment of the invention.
Figure 24:
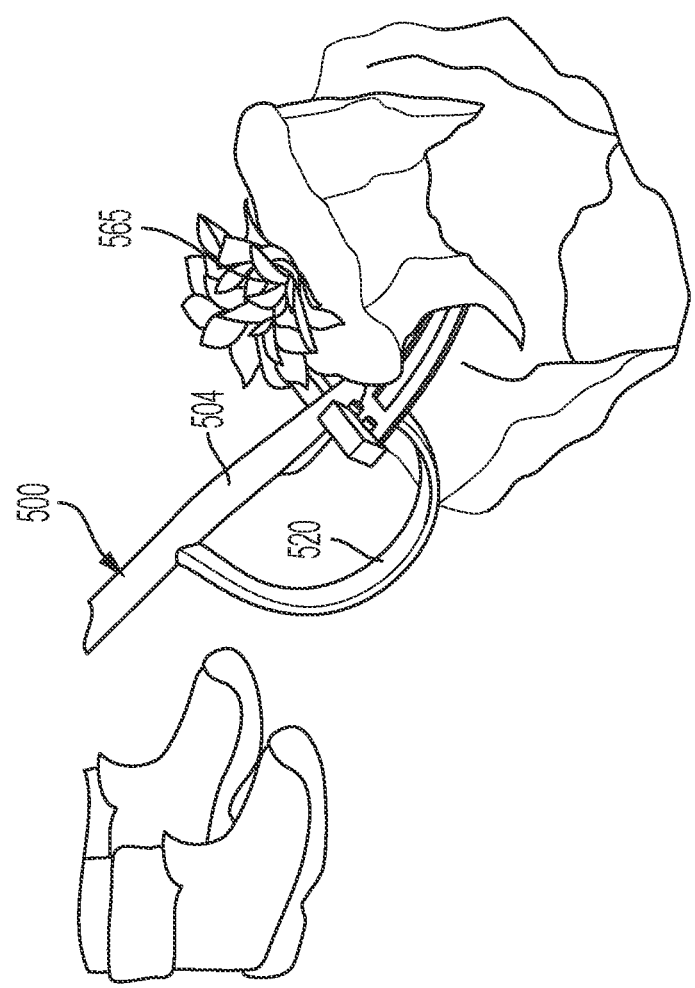
FIG. 24 shows a partial view of the person and the device of FIG. 23 holding earth after pivoting on the pivot hoop.

FIGS. 23 and 24 show a usage case example of embodiments of the invention. In FIG. 23, the user is shown using their foot 511 on the secondary foot support formed by the pivot hoop 520 that is affixed to the shaft 504 in order to assist in pushing the device 500 into the earth. FIG. 24 shows the device 500 holding earth 565 after pivoting on the pivot hoop 520.

Figure 25:
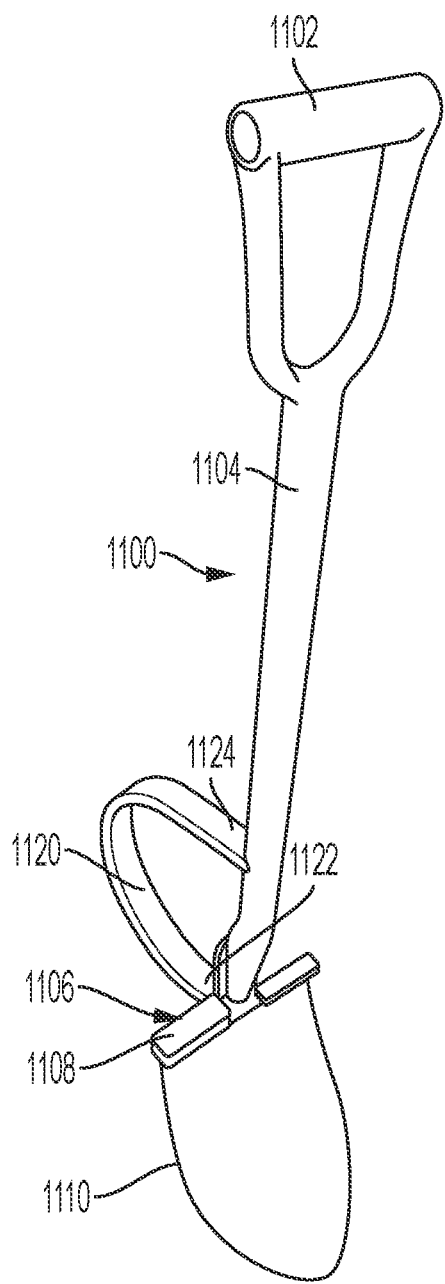
FIG. 25 shows a front view of a device in accordance with some embodiments of the invention comprising a shovel.

FIG. 25 shows a front view of a device in accordance with some embodiments of the invention. There is shown a device 1100 having a handle 1102, shaft 1104, and a tool 1106 attached to the distal end of the handle. In some embodiments, the handle and shaft may be one and the same.

As shown in the example of FIG. 24, the tool 1106 is a shovel, and is also referred to herein as shovel 1106. The shovel 1106 includes a bar 1108 and a set of tines 1110 extending therefrom. Pivot hoop 1120 extends from an interface point 1124 at the shaft to an interface point 1122 at the bar (or component of other tool in alternative embodiments). During use of the device 1100, the pivot hoop 1120 can serve as a fulcrum to assist in operating the device 1100 to lift/move a payload, creating a force multiplier effect. In some use cases, the payload may be dirt, snow, rocks, root crops, weed roots, tubers for bulb division, turf and bush balls, and/or other loose material.

Figure 26:
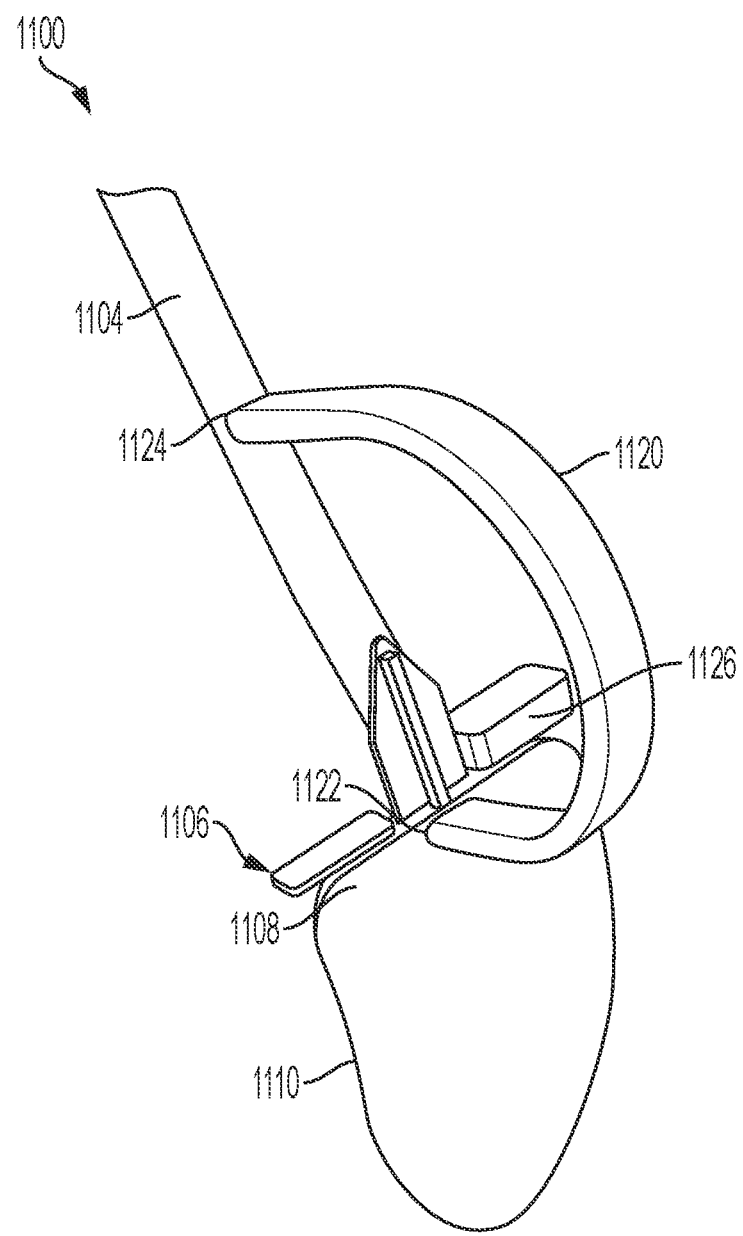
FIG. 26 is a back side view of the device of FIG. 25.

Referring now also to FIG. 26, which is a side view of the device 1100, the pivot hoop against the shaft 1104 is referred to as "D-shaped" since it resembles a capital letter "D". In some embodiments, the pivot hoop 1120 is metal, and is welded to the shaft 1104 and shovel 1106. This addresses the moments of force in a compressive manner and not a flexural manner. Due to the geometry of the bent, welded metal, the forces throughout movement of the unitized pivot hoop distributing the forces (weight) throughout the entire pivot hoop structure. This is in order to provide maximum structural integrity. The forces are distributed and converted in a compressive manner. In some embodiments, the pivot hoop 1120 may be attached to the shaft 104 at both attach points, and not directly attached to the fork 1106. In some embodiments, a foot support 1126 may be affixed to the fork 1106 for additional force for inserting the device into the ground during use.

As can be seen in the aforementioned examples, the flat portion 132 (see FIG. 3) of the pivot hoop also serves as a secondary foot support. When a user is stretching far into a bed that should not be stepped in, it provides the user additional leverage and ability to work deeper and more efficiently. Additionally, it is possible to 'push forward' over the ground and 'slide' into the next section efficiently moving (mowing) to the next area without lifting the tool.

In some embodiments the pivot hoop may have a shape such as shown in FIG. 3. In some embodiments, the pivot hoop may be solid, such as shown in FIG. 17. The pivot hoop may be comprised of a metal, including steel, iron, aluminum, or other suitable alloy. In some embodiments, the pivot hoop may be comprised of a polymer, such as polycarbonate or other suitable plastic material. In embodiments, the pivot hoop may be comprised of a combination of metal and polymer materials. In some embodiments, the pivot hoop is comprised of an outer metal skin that is formed around a plastic (lightweight and non-compressive) core. The pivot hoop may in some embodiments be round, oval, or other shape. These shapes can include true circles, ecliptic shapes and/or any amount of an arc. In some embodiments, the pivot hoop may be formed as a polygon with multiple sides. The polygon may be an irregular polygon. In some embodiments, the pivot hoop may have a spherical shape.

In some embodiments, the tool may be comprised of a metal such as iron or another suitable material. In some embodiments, the shaft may be comprised of wood, polymer, carbon fiber, polymers, or another suitable material.

Disclosed embodiments operate as a lever tool, a simple machine in classic terms. There are numerous needs for a tool of disclosed embodiments, which has a built-in dynamic fulcrum. It is well-suited for tasks like lifting objects such as crates, couches and other tasks that require a force multiplier for weights beyond just muscle power. As there is an attached dynamic fulcrum, there is also a proper way to utilize this tool. When properly operating this tool, the motion of work is allowing the use of body weight aligned with gravity and that body being in proper alignment for the vertebrae. This is a distinct class of tool as defined by its work and operation. The 'shoveling' motion, also used in common border forks, is not used as primary operating activity. Its use as lever device is secondary until it serves as useful and safer than physical exertion. Thus, disclosed embodiments provide significant improvements in the field of hand tools for moving earth and other materials.

As can now be appreciated, disclosed embodiments provide an improved hand tool that reduces fatigue and risk of injury during use. A pivot hoop is affixed to the rear side of a shaft from a hand tool such as a fork, weeder, or shovel. The pivot hoop provides additional leverage during operation of the tool. The pivot hoop enables a user to perform tasks that normally require two hands using only one hand, making it ideal for users that have limited or no use of one of their hands. The placement of the pivot hoop on a ground surface force a proper back-and-forth motion of the user, and avoid a twisting motion. The twisting motion can increase the chance of injury. Thus, disclosed embodiments provide ergonomic features that can improve the safety and comfort of the user.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components, the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A device comprising:
a tool;
a shaft; and
a D-shaped pivot hoop extending from the shaft, wherein the pivot hoop comprises a first flat portion, a second flat portion, and wherein the first flat portion and second flat portion transition to an arc portion, and wherein the first flat portion and second flat portion have a first thickness, and the arc portion has a second thickness, wherein the second thickness is less than the first thickness; and wherein the arc extends approximately 180 degrees between the first flat portion and the second flat portion.

2. The device of claim 1, wherein the pivot hoop extends from the shaft to the tool.

3. The device of claim 2, wherein the tool is a fork, having a bar and a set of tines extending therefrom.

4. The device of claim 3, wherein the pivot hoop is welded to the bar of the fork.

5. The device of claim 2, wherein the arc portion is disposed between an interface point with the shaft and an interface point with the tool.

6. The device of claim 5, wherein each of the first flat portion and second flat portion have a length of approximately three inches from their respective interface points with the tool to the arc.

7. The device of claim 2, where in the pivot hoop extends perpendicularly from an interface point with the tool.

8. The device of claim 1, wherein the pivot hoop is comprised of steel, iron, or a polymer.

9. The device of claim 1, wherein the pivot hoop is comprised of polycarbonate.

10. The device of claim 1, further comprising a handle.

11. The device of claim 1, wherein the tool is a shovel.

12. The device of claim 1, further comprising a foot mount.

13. The device of claim 12, wherein the foot mount is disposed on the tool.

14. The device of claim 1, wherein the pivot hoop is removably clamped to the shaft.

15. The device of claim 1, wherein the pivot hoop is comprised of metal.

16. The device of claim 1, wherein the shaft is comprised of wood or metal.

17. The device of claim 1, wherein:
an exterior surface of the arc portion comprises a concave shape, forming a first canal bordered by a first set of tracks; and
wherein an interior surface of the arc portion comprises a concave shape, forming a second canal bordered by a second set of tracks.

18. A device comprising:
a tool;
a shaft; and
a pivot hoop extending from the device at two interface points, wherein the pivot hoop comprises a flat portion at the first interface point closest to the tool, wherein an arc portion is formed between said flat portion and the second interface point; wherein the first flat portion has a first thickness, and the arc portion has a second thickness, wherein the second thickness is less than the first thickness, and
wherein the first flat portion of the pivot hoop that contact ground during use spreads force load onto the arc portion and causing a rolling in one direction, thereby increasing stability of the device during use.

* * * * *